(12) United States Patent
Takai

(10) Patent No.: US 11,811,987 B2
(45) Date of Patent: Nov. 7, 2023

(54) OPERATION INPUT DEVICE AND IMAGE FORMING APPARATUS

(71) Applicant: KYOCERA Document Solutions Inc., Osaka (JP)

(72) Inventor: Kenji Takai, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/677,750

(22) Filed: Feb. 22, 2022

(65) Prior Publication Data

US 2022/0279077 A1 Sep. 1, 2022

(30) Foreign Application Priority Data

Feb. 26, 2021 (JP) .................. 2021-029552

(51) Int. Cl.
  *G06F 3/044* (2006.01)
  *H04N 1/00* (2006.01)
(52) U.S. Cl.
  CPC .......... *H04N 1/0049* (2013.01); *G06F 3/044* (2013.01); *H04N 1/00392* (2013.01); *H04N 1/00474* (2013.01); *G06F 2203/04108* (2013.01); *H04N 2201/0094* (2013.01)
(58) Field of Classification Search
  CPC ............. H04N 1/0049; H04N 1/00392; H04N 1/00474; H04N 2201/0094; G06F 3/044; G06F 2203/04108; G06F 3/0482; G06F 3/0446; G06F 3/04842; G06F 3/0488; G06F 3/041; G06F 3/03; G06F 3/01; G06F 3/00
  See application file for complete search history.

(56) References Cited

U.S. PATENT DOCUMENTS

| 2008/0012835 | A1* | 1/2008 | Rimon | G06F 3/04186 345/173 |
| 2012/0287064 | A1* | 11/2012 | Kunori | G07F 7/1033 345/173 |
| 2015/0009136 | A1* | 1/2015 | Kato | G06F 3/044 345/157 |
| 2015/0199101 | A1* | 7/2015 | Hwang | G06F 3/0488 715/862 |
| 2022/0291814 | A1* | 9/2022 | Nakamura | G06F 3/041 |

FOREIGN PATENT DOCUMENTS

JP   2008-257629 A   10/2008

* cited by examiner

*Primary Examiner* — Ke Xiao
*Assistant Examiner* — Mohamed S Younes
(74) *Attorney, Agent, or Firm* — Stein IP, LLC

(57) ABSTRACT

An operation input device accepts non-contact operation on an operation image with a pointer. The operation input device includes a display panel and a sensing portion. The sensing portion outputs a first output value and a second output value. If a first operation image, which is an operation image corresponding to the second output value observed when the first output value is equal to a first reference value, and a second operation image, which is an operation image corresponding to the second output value observed when the first output value is equal to a second reference, differ, the display panel displays the first and second operation images with highlighting.

9 Claims, 9 Drawing Sheets

OPERATION INPUT DEVICE AND IMAGE FORMING APPARATUS

INCORPORATION BY REFERENCE

This application is based on and claims the benefit of priority from Japanese Patent Application No. 2021-029552 filed on Feb. 26, 2021, the contents of which are hereby incorporated by reference.

BACKGROUND

The present disclosure relates to an operation input device that accepts non-contact operation, and also relates to an image forming apparatus provided with such an operation input device.

Some known apparatuses accept input through touches on a screen. Such apparatuses include ticket-vending machines at railway stations, and car navigation systems. A touch at a deviated position may result in pressing a button nearby, that is, making a wrong input. A wrong input necessitates canceling the input or making a setting one again. The user feels troublesome. Indications are thus often provided so as to reduce wrong inputs.

An input device provided with a touch panel displays buttons (operation keys). The user moves a finger toward the button that the user wants to press and presses (touches) the surface of the screen. On a touch panel, the end point of a touch operation is the screen; a touch operation has a definite end point. Even if the finger sways or swerves while moving, its position can be corrected before making a touch.

Inconveniently, infectious diseases can be transmitted through contact with an object (contagious infection). A touch panel is touched with human fingers. Hence is the idea to furnish an apparatus handled by a number of people with a non-contact user interface.

SUMMARY

According to one aspect of the present disclosure, an operation input device accepts non-contact operation on an operation image with a pointer. The operation input device includes a display panel and a sensing portion. The display panel displays an operation screen including the operation image on a display surface. The sensing portion outputs a first output value and a second output value. The sensing portion outputs as the first output value a value corresponding to the distance of the pointer from the display surface in the direction perpendicular to the display surface. The sensing portion outputs as the second output value a value corresponding to the position of the pointer on a plane parallel to the display surface. If a first operation image, which is an operation image corresponding to the second output value observed when the first output value is equal to a first reference value, and a second operation image, which is an operation image corresponding to the second output value observed when the first output value is equal to a second reference value different from the first reference value, differ, the display panel displays the first and second operation images with highlighting.

This and other objects of the present disclosure, and the specific benefits obtained according to the present disclosure, will become apparent from the description of embodiments which follows.

DETAILED DESCRIPTION

With reference to FIGS. 1 to 8, a description will be given below of an operation input device 100 according to an embodiment of the present disclosure and an image forming apparatus incorporating the operation input device 100. The following description deals with, as an example of the image forming apparatus, a multifunction peripheral 200. It should be understood that any features specifically described in terms of structure, arrangement, etc. in connection with any embodiments herein are not meant to limit the scope of the present disclosure but are merely given for the sake of illustration.

For non-contact selection or input, a gesture is performed on an operation button (operation key) displayed. For example, in one gesture, a finger is brought close to a button. If, however, the finger sways or is moved slantly to the button, the gesture is likely to be taken as one on a button different from the intended one. Compared with a touch panel, a non-contact input device is expected to be prone to selection of wrong buttons, that is, wrong inputs.

In view of the above problem, the embodiment is devised to prevent wrong inputs when accepting non-contact inputs.

Figure 1:
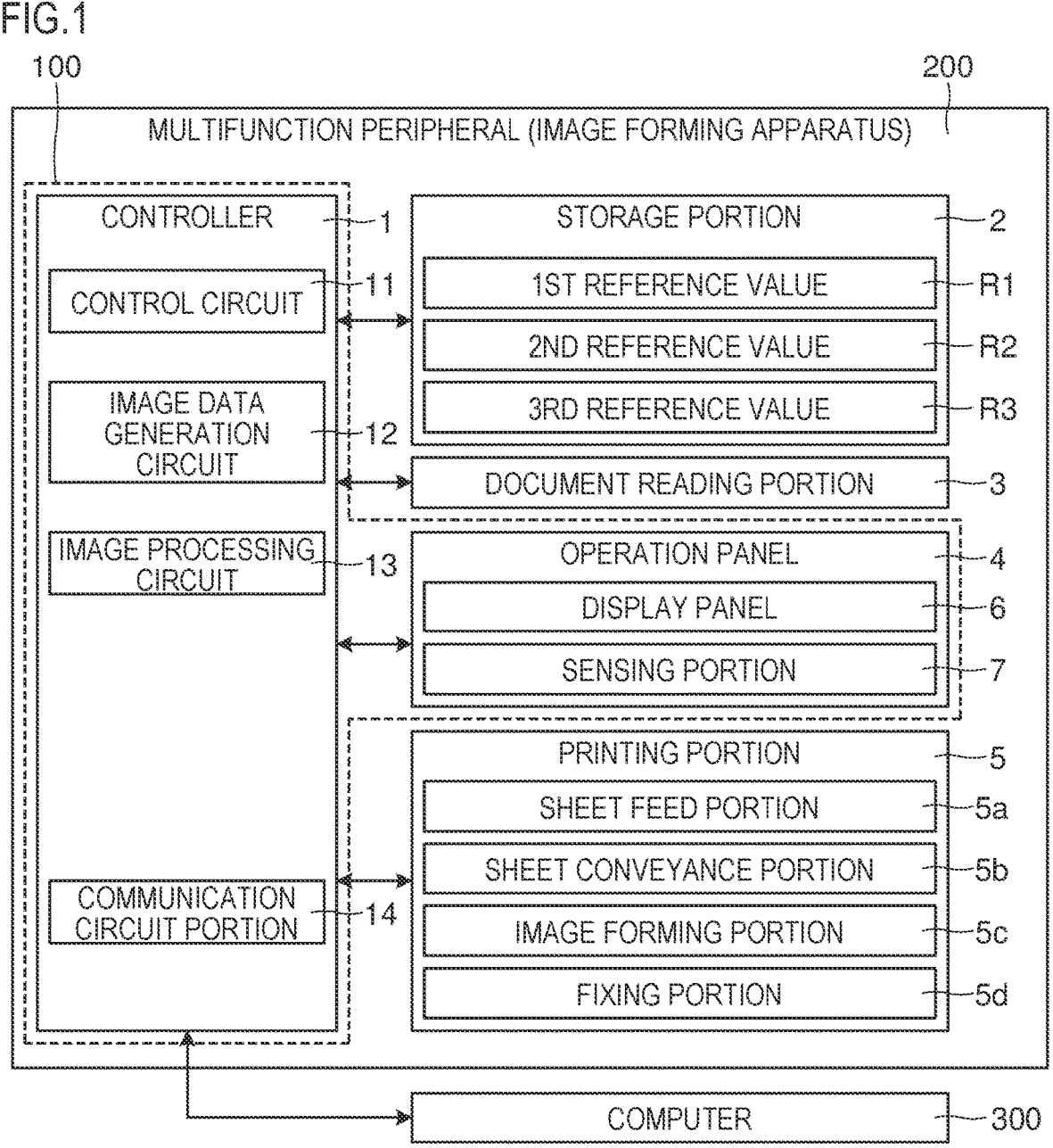
FIG. 1 is a diagram showing one example of a multifunction peripheral according to an embodiment.
Figure 2:
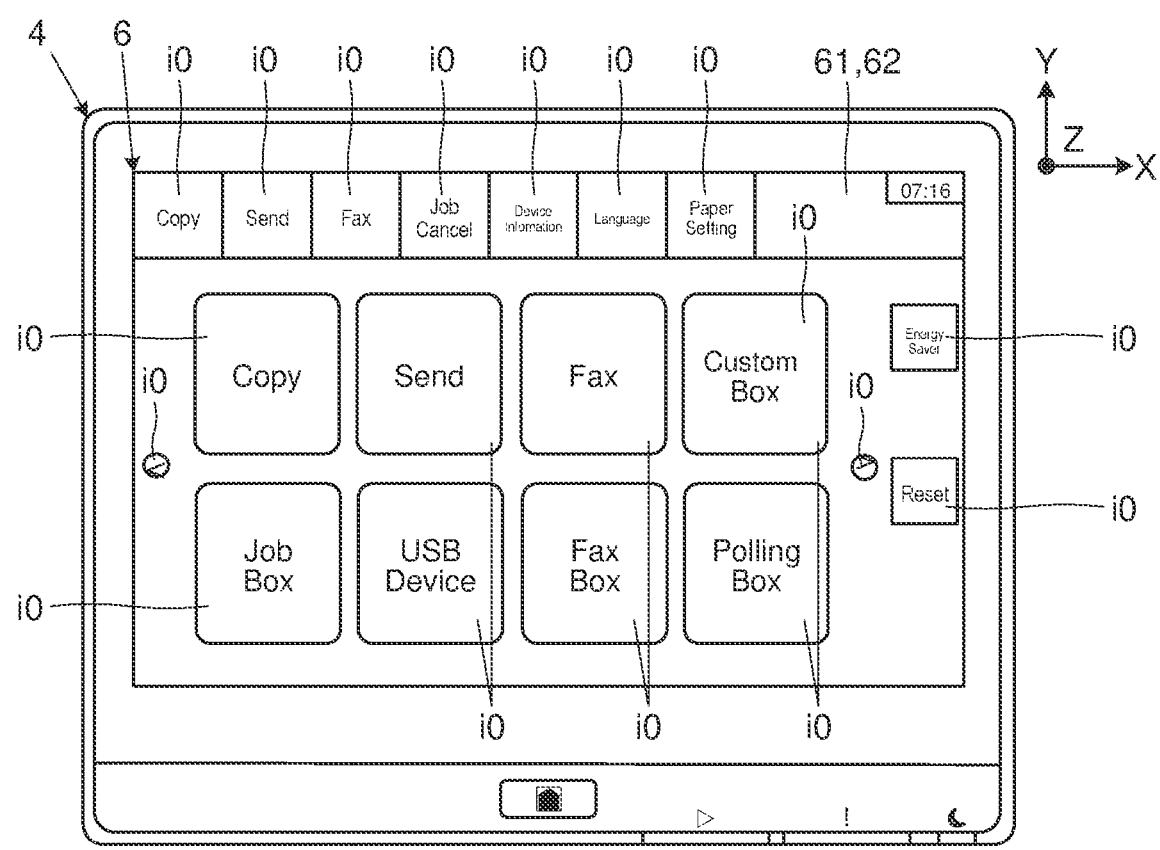
FIG. 2 is a diagram showing one example of an operation panel according to the embodiment.

1. Multifunction Peripheral 200:

First, with reference to FIGS. 1 and 2, the multifunction peripheral 200 according to the embodiment will be described in outline. FIG. 1 is a diagram showing one example of the multifunction peripheral 200 according to the embodiment. FIG. 2 is a diagram showing one example of an operation panel 4 according to the embodiment.

The multifunction peripheral 200 includes a controller 1, a storage portion 2, a document reading portion 3, an operation panel 4, and a printing portion 5. The controller 1 controls the operation of the multifunction peripheral 200. The controller 1 is, for example, a circuit board. The controller 1 controls the operation of different blocks in the multifunction peripheral 200 in a job (such as copying and transmission). The controller 1 includes a control circuit 11, an image data generation circuit 12, an image processing circuit 13, and a communication circuit portion 14. The control circuit 11 performs processing and calculation involved in a job. The image data generation circuit 12 includes an A-D conversion circuit. The image data generation circuit 12 processes an analog image signal that the document reading portion 3 outputs by reading a document, and thereby generates document image data. The image processing circuit 13 is an integrated circuit for image processing e.g., an ASIC). The image processing circuit 13 performs image processing on the document image data.

The communication circuit portion 14 includes a communication control circuit and a communication memory. The communication memory stores communication software. Based on the communication software, the communication control circuit controls communication. The communication circuit portion 14 communicates with a computer 300. The computer 300 is, for example, a personal computer or a server. The communication circuit portion 14 receives print data from the computer 300. Based on the received print data, the controller 1 makes the printing portion 5 perform printing (a print job). In a scan transmission job, the controller 1 makes the communication circuit portion 14 transmit a transmission file based on the document image data to a set destination.

The multifunction peripheral 200 includes, as the storage portion 2, a RAM, a ROM, and a storage. The storage is, for example, a HDD or a SSD or both. Based on programs and data stored in the storage portion 2, the controller 1 controls different blocks. The document reading portion 3 includes a light source and an image sensor. The document reading portion 3 reads a document and outputs an analog image signal.

The operation panel 4 accepts settings from the user. The operation panel 4 includes a display panel 6 and a sensing portion 7. The operation panel 4 may or may not include hardware keys for operation. FIG. 2 shows an example of an operation panel 4 that includes a hardware key for return to a home screen. The display panel 6 is, for example, a liquid crystal display panel or an organic EL display panel. As shown in FIG. 2, the display panel 6 is a part of the operation panel 4, and has a display surface 61 visible to the user. The controller 1 makes the display panel 6 (display surface 61) display messages and operation screens 62 (setting screens). That is, the display panel 6 displays an operation screen 62 on the display surface 61. FIG. 2 shows one example of the operation panel 4 displaying the home screen. The home screen is one of different operation screens 62.

The operation screen 62 shows operation images i0 that are selectable by non-contact operation. The controller 1 makes the display panel 6 display operation images i0. The operation images i0 are, for example, images depicting buttons (software keys), tabs, and icons. The operation panel 4 incudes the sensing portion 7. The sensing portion 7 is fitted on the display surface 61 of the display panel 6. The sensing portion 7 includes, for example, a projection-type capacitive sensing panel. The sensing portion 7 can be used also as a touch panel. Based on the output of the sensing portion 7, the controller 1 recognizes an operation image i0 operated (details will be given later). The operation panel 4 accepts settings as to, for example, the type of the job to be executed and set values for the job. Based on the output of the operation panel 4, the controller 1 recognizes settings made.

The printing portion 5 includes a sheet feed portion 5a, a sheet conveying portion 5b, an image forming portion Sc, and a fixing portion 5d. The sheet feed portion 5a includes, for example, a sheet cassette for storing sheets and a sheet feed roller for feeding out the sheets. During printing, the controller 1 makes the sheet feed portion 5a feed sheets. The sheet conveying portion Sb includes, for example, a motor and a pair of conveyance rollers. The controller 1 makes the sheet conveying portion 5b convey the sheets fed out from the sheet feed portion 5a. The image forming portion 5c includes, for example, a photosensitive drum, a charging device, an exposure device, a developing device, and a transfer roller. The controller 1 electrostatically charges the photosensitive drum, and exposes it to light based on image data. The controller 1 develops an electrostatic latent image on the photosensitive drum with toner. The controller 1 transfers the toner image to a sheet. The fixing portion 5d includes, for example, a heater and a fixing roller. The controller 1 makes the fixing portion 5d heat and press the sheet having the toner image transferred to it. The controller 1 makes the fixing portion 3d fix the toner image.

Figure 3:
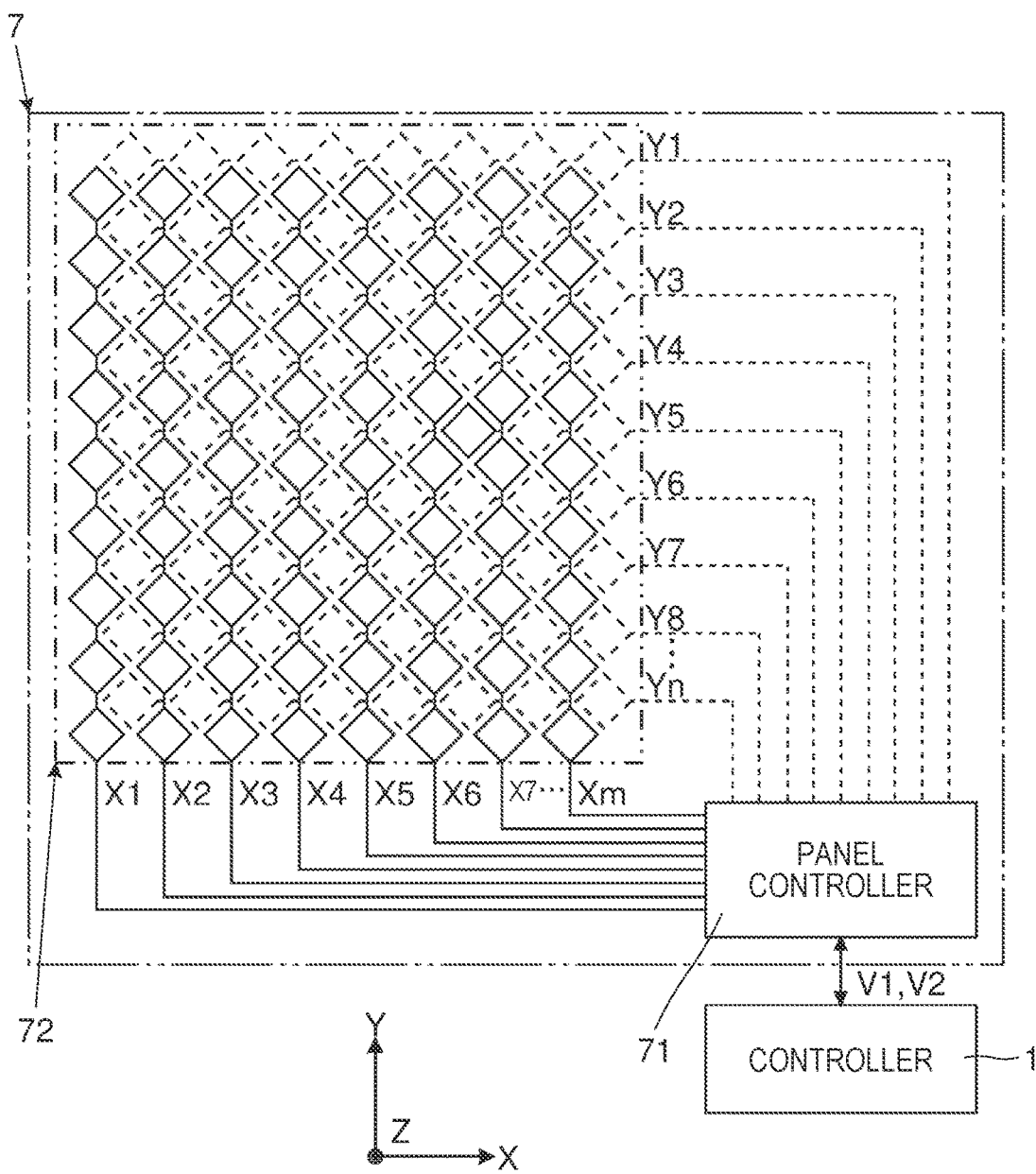
FIG. 3 is a diagram showing one example of a sensing portion according to the embodiment.
Figure 4:
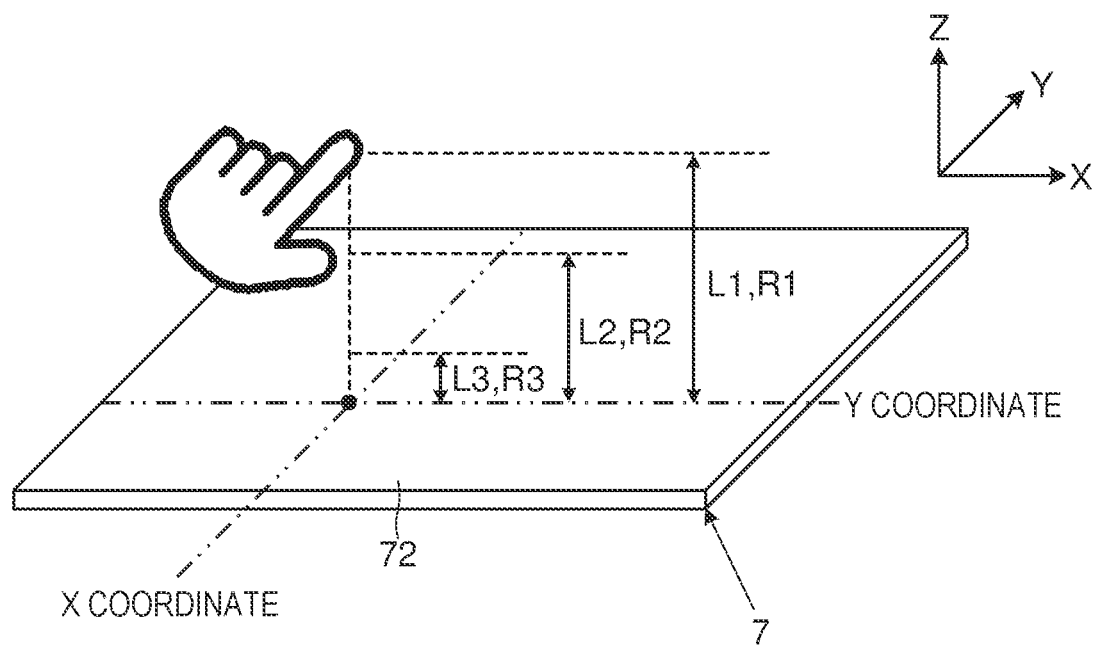
FIG. 4 is a diagram showing one example of sensing of the distance and position of a pointer according to the embodiment.

2. Operation Input Device 100:

With reference to FIGS. 2 to 4, a description is given of one example of the operation input device 100 according to the embodiment. FIG. 3 is a diagram showing one example of the sensing portion 7 according to the embodiment. FIG. 4 is a diagram showing one example of the sensing of the distance and position of a pointer according to the embodiment.

The operation input device 100 includes the operation panel 4. The operation panel 4 includes the display panel 6 and the sensing portion 7. The following description deals with an example where, fed with the output of the sensing portion 7, the controller 1 performs processing related to highlighting. To that end, the operation input device 100 may include the controller 1. Instead of the controller 1, a display control circuit (display controller) that performs control and processing related to highlighting may be provided in the operation panel 4. In that case, the control and processing described below performed by the controller 1 may be assumed by that display control circuit.

The operation input device 100 is a device that accepts non-contact operation with a pointer. The pointer may be anything that is moved to point and select an operation image i0 shown on the display panel 6. The pointer can be a finger of the user (operator) of the operation panel 4. The pointer can instead be a pen (such as a stylus pen) held by the user and sensed by the sensing portion 7. The pointer as a tool may have any shape other that that of a pen. As is often the case with touch operation, the pointer is expected to be a finger in many cases.

The sensing portion 7 senses the position of the pointer. As shown in FIG. 3, the sensing portion 7 includes a capacitive sensing panel and a panel controller 71. In the following description, the capacitive sensing panel is referred to as the sensing panel 72. The sensing panel 72 is transparent. The sensing panel 72 is, for example, attached on the display surface 61. A capacitive sensing touch panel can be used as the sensing panel 72. Compared with a touch panel of which the surface is actually touched, the sensing panel 72 has increased sensitivity.

In the following description, the direction perpendicular to the display surface 61 of the display panel 6 is referred to as Z direction. The display panel 6 has, for example, a rectangular display surface 61. Of the directions that are perpendicular to Z direction and parallel to the display surface 61 of the display panel 6 and that run along the longer and shorter sides, respectively, of the panel controller 71, one is referred to as X direction and the other as Y direction. In the following description, with the display surface 61 of the display panel 6 viewed from in front, the horizontal direction is referred to as X direction and the vertical direction as Y direction.

FIG. 3 is a diagram showing one example of the sensing panel 72. The sensing panel 72 includes, for example, electrodes arrayed in a matrix. The electrodes are transparent. The sensing panel 72 has a layer that includes a plurality of electrodes (hereinafter referred to as X electrodes, or electrodes of group X) arrayed along X direction (horizontal direction in FIG. 3), each composed of a series of pieces of electrically conductive film, each in a rhombic (square) shape, connected together. In FIG. 3, the X electrodes are identified by the reference signs X1 to Xn. The sensing portion 7 also has a layer that includes a plurality of electrodes (hereinafter referred to as Y electrodes, or electrodes of group Y) arrayed along Y direction (vertical direction in FIG. 3), each composed of a series of pieces of electrically conductive film, each in a rhombic (square) shape, connected together. In FIG. 3, the V electrodes are identified by the reference signs Y1 to Yn. The number of X electrodes and the number of Y electrodes determine the resolution of the sensing portion 7.

The electrodes (each a series of pieces of electrically conductive film) are individually connected to the panel controller 71. Depending on whether the pointer is present over the top surface of the sensing portion 7, the capacitance that the panel controller 71 senses varies. When the user brings the pointer close to the top surface of the sensing portion 7 (sensing panel 72), the capacitance of electrodes and that of the pointer (human body) couple together. Moreover, according to the degree of coupling of those capacitances, the sensed capacitance varies. That is, depending on the distance of the pointer from the top surface of the sensing portion 7 (i.e., the display surface 61 of the display panel 6), the magnitude of the sensed capacitance varies (see FIG. 4).

For example, the panel controller 71 applies a voltage to one among the electrodes of one of groups X and Y. The panel controller 71 switches, among the electrodes of one of groups X and Y, the one to which it applies the voltage from one electrode to another. On the other hand, the panel controller 71 reads, among the electrodes of the other of groups X and Y, the voltages at the individual electrodes. When a voltage is applied to adjacent electrode patterns and a potential difference appears between them, a capacitance corresponding to an insulating object (dielectric body) is obtained. For example, the closer a finger is to the sensing portion 7, the higher the capacitance sensed is.

For example, the capacitance obtained with no pointer present is taken as a reference capacitance. The panel controller 71 recognizes electrodes at which the capacitance has changed from the reference capacitance. For, among the electrodes at which the capacitance has changed from the reference capacitance, the one with the largest change, the panel controller 71 determines the magnitude of the capacitance. The magnitude of the capacitance has a value that corresponds to the distance from the pointer to the sensing portion 7 (display surface 61). The panel controller 71 also determines the coordinates of the electrode with the largest change in capacitance as the position of the pointer (its coordinates on XY plane). Here, the coordinates are information that indicates the places of the X and Y electrodes in the arrays they are in.

The panel controller 71 notifies the controller 1 of the determined magnitude of the capacitance and the determined position (coordinates) of the pointer. In the following description, the value that indicates the determined magnitude of the capacitance is referred to as the first output value V1; the value that indicates the determined position (coordinates) of the pointer is referred to as the second output value V2. The sensing portion 7 outputs the first and second output values V1 and V2 to the controller 1 (see FIG. 3). That is, the sensing portion 7 outputs, as the first output value V1, a value that corresponds to the distance between the display surface 61 and the pointer in the direction perpendicular to the display surface 61, the sensing portion 7 outputs, as the second output value V2, a value that corresponds to the position of the pointer on a plane parallel to the display surface 61 (the position on XY plane).

The sensing portion 7 may recognize the distance and the pointer position by any other method. For example, the panel controller 71 can recognize the distance and the pointer position by measuring the speed at which each electrode is charged with electric charge. The sensing portion 7 may be a capacitive touch panel of any other type. The sensing portion 7 may be an infrared sensing device that includes a plurality of infrared light-emitting elements and a plurality of light-receiving elements and that senses the distance of the pointer from the display surface 61 and the position of the pointer on a plane parallel to the display surface 61.

Figure 5:
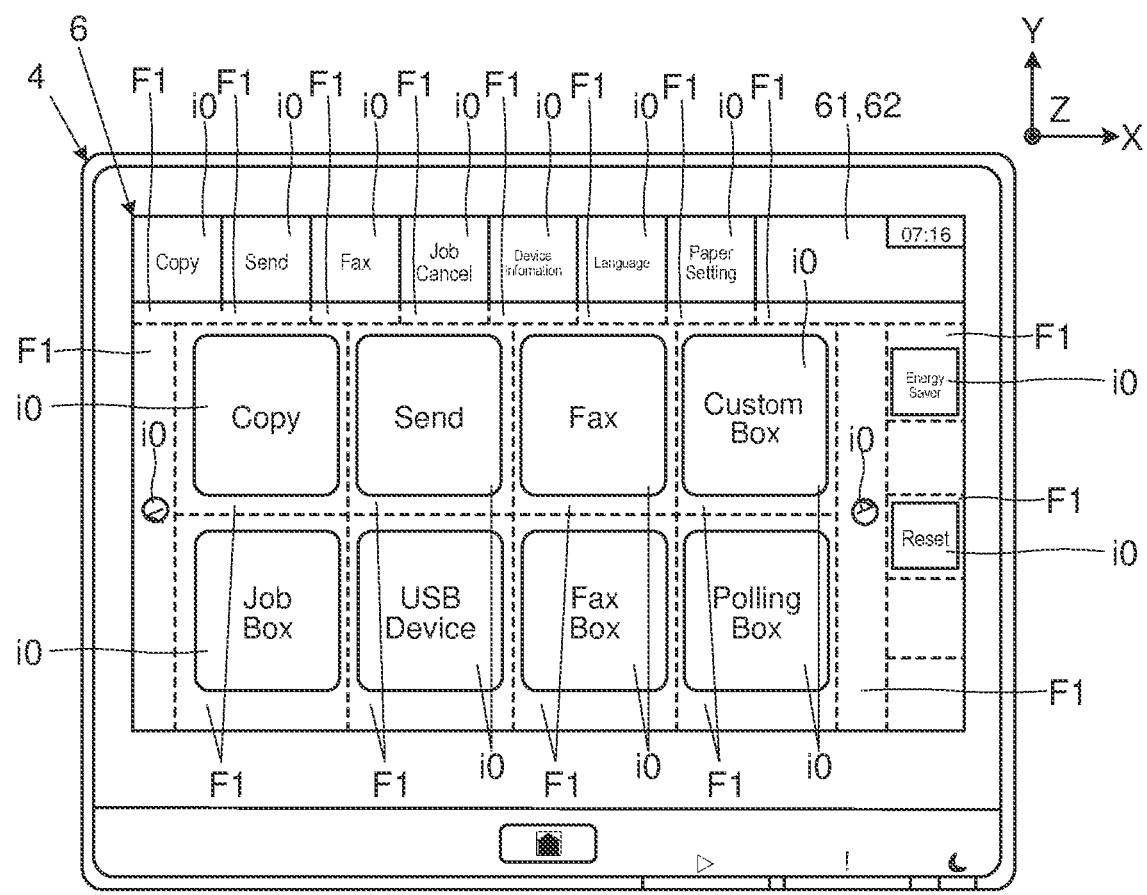
FIG. 5 is a diagram showing one example of division of an operation screen into regions according to the embodiment.

3. Division of the Operation Screen 62:

Next, with reference to FIG. 5, one example of division of the operation screen 62 according to the embodiment will be described. FIG. 5 is a diagram showing one example of division of the operation screen 62 according to the embodiment.

FIG. 5 shows one example of the operation panel 4 and the operation screen 62 displayed on the display panel 6. As shown in FIG. 5, the operation screen 62 may be divided beforehand into a plurality of division regions F1. In FIG. 5, broken lines indicate the boundaries among the division regions F1. As shown in FIG. 5, the controller 1 may show the boundaries among the division regions F1. The controller 1 may not show the boundaries among the division regions F1. The division region F1 each includes one operation image i0 (button).

Figure 6:
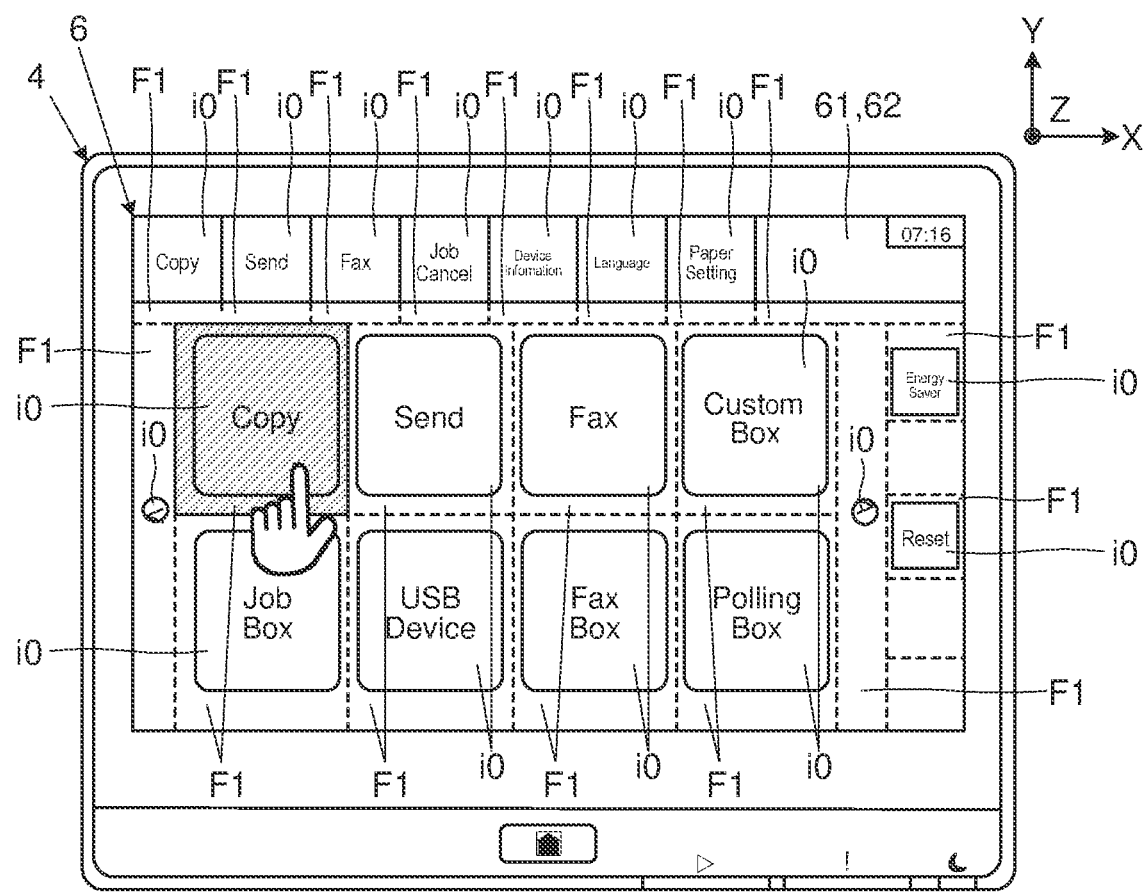
FIG. 6 is a diagram showing one example of pointer position display according to the embodiment.

4. Confirmation of Selection and Non-Contact Operation on the Operation Screen 62:

Next, with reference to FIGS. 4 to 6, a description will be given of one example of non-contact operation on the operation input device 100 according to the embodiment. FIG. 6 is a diagram showing one example of pointed position display according to the embodiment.

The operation input device 100 accepts non-contact operation: the user does not need to touch an operation image i0 (button) displayed on the display panel 6 to confirm selection of the operation image i0. Thus, during operation and input, the user does not need to touch the display surface 61 of the display panel 6. It is thus possible to reduce the contact with an object touched by a number of people, thereby to prevent herd infection with an infectious disease in an office.

When selecting an operation image i0 displayed on the display panel 6, the user brings a pointer (finger) close to the operation image i0 that the user wants to select. With no contact with the display panel 6, the operation image i0 to which the pointer has come close enough is confirmed (recognized) by the controller 1 as the selected operation image i0. Thus, bringing the pointer close to the target achieves input.

For a non-contact operation, a first distance L1, a second distance L2, and a third distance L3 are defined with respect to the distance between the pointer and the display surface 61 in the direction perpendicular to the display surface 61. The first, second, and third distances L1, L2, and L3 have the relationship L1>L2>L3. The third distance L3 is greater than zero. The first distance L1 is a distance at which the first output value V1 equals a first reference value R1. The second distance L2 is a distance at which the first output value V1 equals a second reference value R2. The third distance L3 is a distance at which the first Output value V1 equals a third reference value R3, The storage portion 2 stores the first, second and third reference values R1, R2, and R3 in a non-volatile manner (see FIG. 1).

The first distance L1 is, for example, 10 cm. The first reference value R1 is the value of the capacitance sensed when the distance of the pointer from the display surface 61 in the direction perpendicular to it is about 10 cm. The first distance L1 may be longer or shorter than 10 cm. The second distance L2 is, for example, 6 cm. The second reference value R2 is the value of the capacitance sensed when the distance of the pointer from the display surface 61 in the direction perpendicular to it is about 6 cm. The second distance L2 may be longer or shorter than 6 cm. The third distance L3 is, for example, 2 cm. The third reference value R3a is the value of the capacitance sensed when the distance of the pointer from the display surface 61 in the direction perpendicular to it is about 2 cm. The third distance L3 may be longer or shorter than 2 cm. Assuming that as the pointer is closer the sensed capacitance increases, the first, second and third reference values R1, R2, and R3 have the relationship R3>R2>R1.

Even with the same distance between the display surface 61 and the pointer, the sensed capacitance may vary from one person to another. The sensed capacitance may be affected by humidity. Thus the first, second, and third distances L1, L2, and L3 may vary among people and environments.

To confirm selection of an operation image i0, the user brings the pointer close to the operation image i0 that the user wants to select. Based on the second output value V2, the controller 1 recognizes the position of the pointer on a plane parallel to the display surface 61 (the position of the pointer on XY plane), The controller 1 confirms the operation image i0 that overlaps the position of the pointer on XY plane when the pointer is at the third distance L3 as the selected operation image i0. In other words, the controller 1 confirms the operation image i0 that overlaps the position of the pointer on XY plane when the first output value V1 becomes equal to the third reference value R3 as the selected operation image i0. For example, the controller 1 makes the display panel 6 newly display an operation screen 62 corresponding to the operation image i0 that has been confirmed to be selected.

The controller 1 may instead confirm, when the first output value V1 becomes equal to the third reference value R3, the operation image i0 that is included in the division region F1 that overlaps the position (coordinates) of the pointer recognized based on the second output value V2 as the selected operation image i0. This exerts an effect of substantially enlarging the region in which the operation image i0 is judged to have been operated. For example, even if the position of the pointer recognized based on the second output value V2 falls outside the operation image i0, the controller 1 confirms the operation image i0 that is included in the division region F1 that overlaps the position of the pointer as the selected operation image i0.

On the operation input device 100, pointed position display may be performed. Pointed position display denotes distinctly displaying, before a selected operation image i0 is confirmed, the operation image i0 that is being pointed by the pointer. Pointed position display can be understood to provide distinct display of the operation image i0 that will be selected if the user keeps moving the finger as thus far. For example, the controller 1 performs pointed position display on the display panel 6 for the operation image i0 that corresponds to the position of the pointer on a plane parallel to the display surface 61 when the distance of the pointer from the display surface 61 falls in the range greater than the third distance L3 but smaller than the first distance L1 (first reference value R1≤first output value V1<third reference value R3).

The controller 1 may instead recognize the operation image it) that overlaps the position (coordinates) of the pointer recognized based on the second output value V2 as the pointed operation image i0. The controller 1 may instead recognize the operation image i0 that is included in the division region F1 that overlaps the position (coordinates) of the pointer recognized based on the second output value V2 as the pointed operation image i0. This substantially enlarges the region in which the operation image i0 is judged to be being pointed. For example, even if the position of the pointer recognized based on the second output value V2 falls outside the operation image i0, the controller 1 confirms the operation image it) that is included in the division region F1 that overlaps the position of the pointer as the pointed operation image i0.

The controller 1 may perform pointed position display only for the operation image i0 pointed. The controller 1 may instead perform pointed position display for the entire division region F1 that includes the pointed operation image i0. When performing pointed position display, the controller 1 can put a color to the pointed operation image i0 or to the division region F1 that includes it. For example, the controller 1 can put a pointed position indicating color to, of the pointed operation image i0 or the division region F1 that includes it, the part (pixels) other than text and lines. The pointed position indicating color may be gray, blue, or red. The operation panel 4 may accept selection of the pointed position indicating color. In that case, the controller 1 uses the selected pointed position indicating color. The user can see the operation image i0 that is recognized by the controller 1 as being pointed.

FIG. 6 is a diagram showing one example of pointed position display. FIG. 6 shows one example of a state where an operation image i0 labeled with the text "Copy" is being pointed. For example, as the pointer (finger) is moved to the right from the state in FIG. 6, pointed position display shifts from the operation image i0 labeled with the text "Copy" to an operation image i0 labeled with the text "Send". Thus, moving the pointer over the display panel 6, the user can see the operation image i0 being pointed. The pointed position indicating color may be different from, or the same as, a second highlight color, which will be described later.

Figure 7:
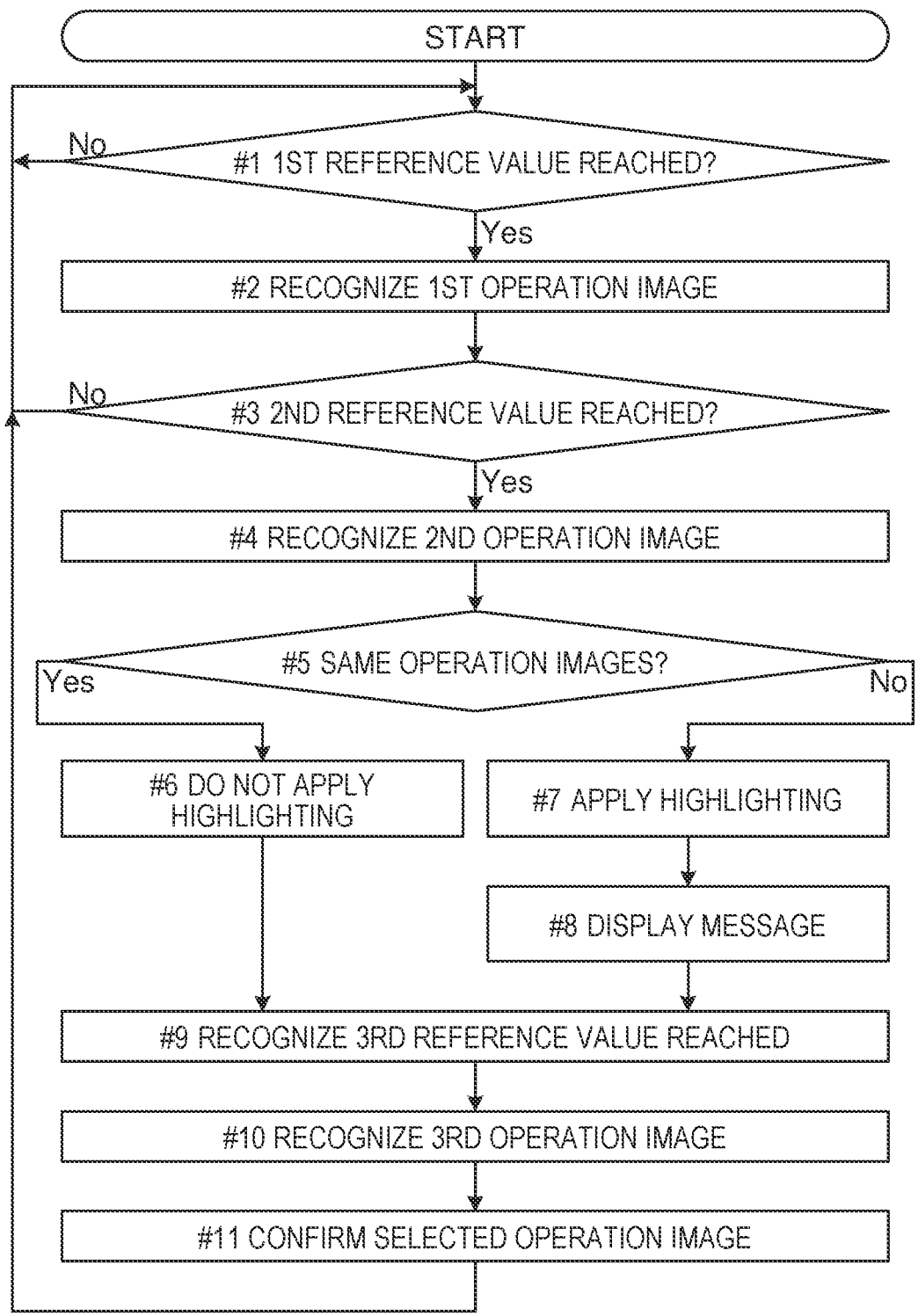
FIG. 7 is a diagram showing one example of non-contact operation and highlighting according to the embodiment.
Figure 8:
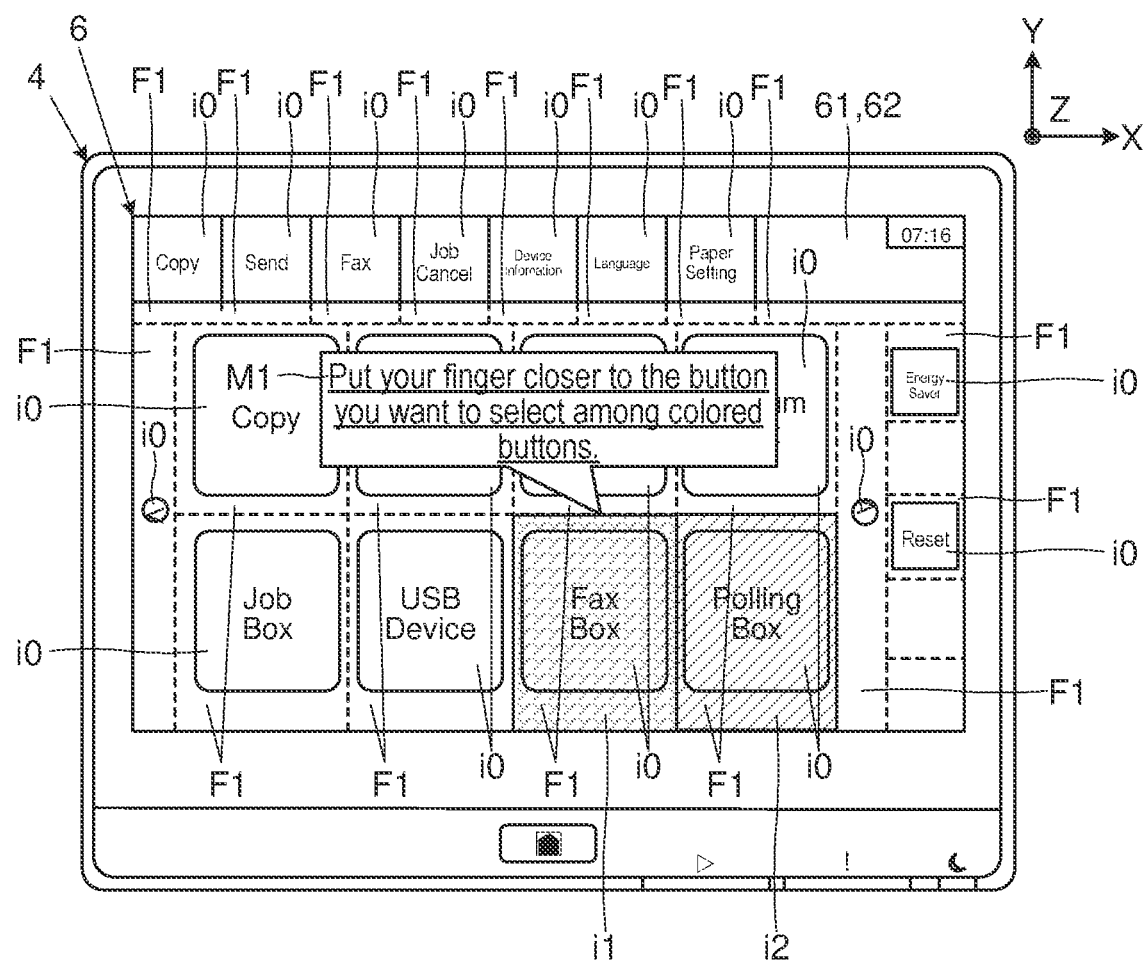
FIG. 8 is a diagram showing one example of an operation screen with highlighting according to the embodiment.
Figure 9:
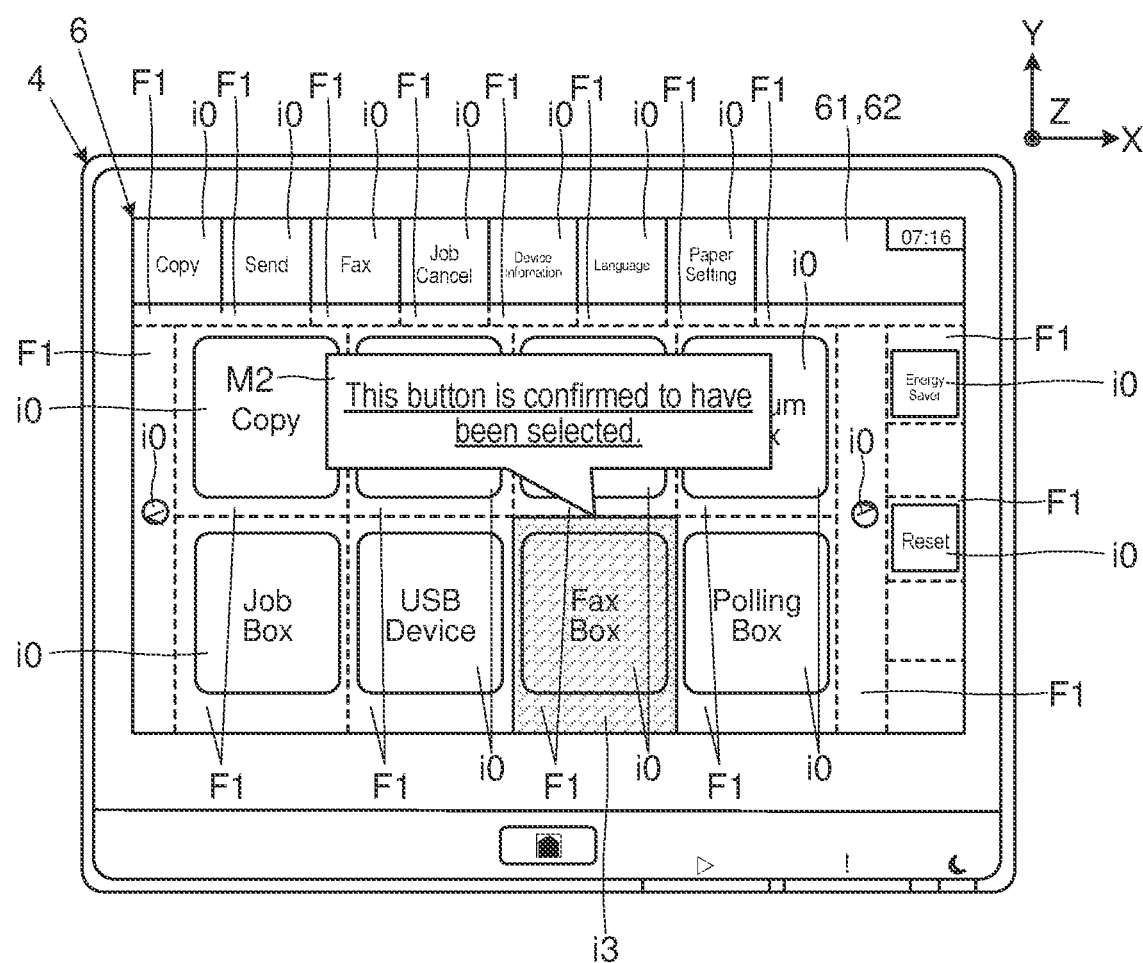
FIG. 9 is a diagram showing one example of screen display with a selected operation image confirmed.

5. Non-Contact Operation and Highlighting:

Next, with reference to FIGS. 7 to 9, a description will be given of one example of non-contact operation and highlighting (highlighted display) on the operation input device 100 according to the embodiment. FIG. 7 is a diagram showing one example of non-contact operation and highlighting according to the embodiment. FIG. 8 is a diagram showing one example of an operation screen 62 with highlighting according to the embodiment. FIG. 9 is a diagram showing one example of screen display with a selected operation image i0 confirmed.

The procedure in FIG. 7 starts when the display panel 6 starts display, the sensing portion 7 starts operating, and the operation input device 100 (operation panel 4) becomes ready to accept operation. For example, when the main power switch on the multifunction peripheral 200 is turned on, or when the multifunction peripheral 200 is awakened from power-saving mode, the procedure in FIG. 7 starts. First the controller 1 keeps checking whether the first output value V1 equals the first reference value R1 (step #1; if "No" at step #1, stay at step #1). That is, the controller 1 keeps checking whether a pointer is close to the display surface 61 until the distance of the pointer from the display surface 61 becomes equal to the first distance L1.

When the first output value V1 becomes equal to the first reference value R1 ("Yes" at step #1), the controller 1 recognizes a first operation image i1 (step #2). The first operation image i1 is the operation image i0 that is pointed when the first output value V1 becomes equal to the first reference value R1 (i.e., the operation image i0 that corresponds to the second output value V2). In other words, the controller 1 recognizes the operation image i0 that lies under the pointer when the distance of the pointer from the display surface 61 equals the first distance L1 as the first operation image i1.

After the first output value V1 becomes equal to the first reference value R1 the controller 1 checks whether the first output value V1 has become equal to the second reference value R2 (step #3). That is, the controller 1 checks whether, as a result of the pointer being brought closer to the display surface 61, the distance of the pointer from the display surface 61 has become equal to the second distance L2.

For example, if, after step 42, the distance of the pointer from the display surface 61 becomes greater than the first distance L1, this means that the pointer has moved away from the display surface 61. The controller 1 can in that case judge that the first output value V1 has not become equal to the second reference value R2 ("No" at step #3). In this case the controller 1 performs step #1 (returns to step #1) For example, in a case where as the distance of the pointer from the display surface 61 decreases the sensed capacitance increases, when the first output value V1 becomes smaller than the first reference value R1, the controller 1 may judge that the first output value V1 has not become equal to the second reference value R2.

After the first output value V1 becomes equal to the first reference value R1, the user may sway the pointer while keeping the distance of the pointer from the display surface 61. For example, the user may sway the pointer while thinking about which operation image i0 to select. After the distance of the pointer from the display surface 61 becomes equal to the first distance L1, so long as the distance of the pointer from the display surface 61 is smaller than the first distance L1 (so long as the first output value V1 indicates a distance closer than the first reference value R1), the controller 1 may keep checking the first output value V1 at predetermined time intervals. For example, in a case where as the distance of the pointer from the display surface 61 decreases the sensed capacitance increases, after the first output value V1 has become equal to or greater than the first reference value R1, so long as the first output value V1 remains equal to or greater than the first reference value R1, the controller 1 may keep checking the first output value V1 at predetermined time intervals.

When the first output value V1 becomes equal to the second reference value R2 ("Yes" at step #3), the controller 1 recognizes a second operation image i2 (step #4). The second operation image i2 is the operation image i0 that is pointed when the first output value V1 becomes equal to the second reference value R2 (i.e., the operation image i0 that corresponds to the second output value V2). In other words, the controller 1 recognizes the operation image its that lies under the pointer when the distance of the pointer from the display surface 61 equals the second distance L2 as the second operation image i2.

The controller 1 then check whether the first and second operation images i1 and i2 are the same (step #5). In other words, the controller 1 checks whether the operation image i0 pointed at the first distance L1 and the operation image i0 pointed at the second distance L2 are the same. That is, the controller 1 checks whether or not the pointer has swerved or swayed during the course of its being moved toward the third distance L3.

If the first and second operation images i1 and i2 are the same ("Yes" at step #5), the controller 1 does not apply highlighting (step #6). If the first and second operation images i1 and i2 differ ("No" at step #5), the controller 1 applies highlighting (step #7).

FIG. 8 shows one example of highlighting. FIG. 8 shows an example where the first operation image i1 is a button labeled with the text "Fax Box" and the second operation image i2 is a button labeled with the text "Polling Box". When highlighting is applied, as shown in FIG. 8, the controller 1 can show the first operation image i1 in a first highlight color. For example, the controller 1 has the pixels of the first operation image i1 except for the text and the frame lines displayed in the first highlight color. The controller 1 can further make the display panel 6 display with highlight, as shown in FIG. 8, not only the first operation image it but also the division region F1 that includes it.

The controller 1 can make the display panel 6 display, as shown in FIG. 8, the second operation image i2 in a second highlight color. For example, the controller 1 has the pixels of the second operation image i2 except for the text and frame lines displayed in the second highlight color. The controller 1 can further make the display panel 6 display with highlight, as shown in FIG. 8, not only the second operation image i2 but also the division region F1 that includes it.

The first highlight color is predefined. The first highlight color may be blue, red, or any other color. The operation panel 4 may accept selection of the first highlight color. The second highlight color too is predefined. The second highlight color may be blue, red, or any other color. The operation panel 4 may accept selection of the second highlight color. The first and second highlight colors are different. The first and second highlight colors may be the same. FIG. 8 shows an example where the first and second highlight colors are different. Highlighting provides distinct display of the operation image i0 over which the pointer is located during the course of its being brought close to the display surface 61. The user can be notified of a possibility of an undesired operation image i0 being selected by a non-contact operation. The user can be warned for careful operation to prevent an wrong input.

Highlighting may be achieved by any method other than by using an additional color in display. For example, the controller 1 may blink the first operation image i1, the second operation image i2, or the division regions F1 that include them, enlarge these, change the color of the text on these, or put a mark such as an arrow.

When applying highlighting, the controller 1 may make the display panel 6 display a message M1 indicating the intention of the highlighting (step #8). As shown in FIG. 8, the controller 1 can have a message M1 (first message) displayed such as "Put your finger closer to the button you want to select among colored buttons". The message M1 warns the user for careful operation. Instead, the controller 1 may make the display panel 6 display a message M1 indicating that the pointed position swerved during the course of a non-contact operation. As shown in FIG. 8, the controller 1 can have a balloon containing the message M1 displayed. In a case where the operation screen 62 has a message display region, the controller 1 can have the message M1 displayed in the message display region.

After step #7 or #9, the controller 1 eventually recognizes the first output value V1 to become equal to the third reference value R3 (step #9). The controller 1 then recognizes a third operation image i3 (step #10), The third operation image i3 is the operation image i0 that is pointed when the first output value V1 becomes equal to the third reference value R3 (i.e., the operation image i0 that corresponds to the second output value V2). The controller 1 then confirms that the third operation image i3 is the selected operation image i0 (step #11). For example, the controller 1 makes the display panel 6 newly display an operation screen 62 that corresponds to the selected operation image i0, The controller 1 then performs step 41 (returns to step #1).

Before confirmation of the selected operation image i0 (third operation image i3) followed by the display of the new operation screen 62, the controller 1 may display a second message M2. In other words, the controller 1 can first make the display panel 6 display the second message M2 and then make the display panel 6 display the new operation screen 62. FIG. 9 shows an example of display of the second message M2, The controller 1 can have a message indicating the operation image i0 (third operation image i3) that is confirmed to have been selected displayed as the second message M2.

Highlighting being applied does not prevent operation. With highlighting applied, the user can continue operation (selection of an operation image i0). Highlighting does not interfere with operation. The user brings the pointer (finger) still closer to the operation image i0 that the user wants to select. When the first output value V1 becomes equal to the third reference value R3, the selected operation image i0 is confirmed. An operation image i0 of which selection can be confirmed is not limited to one to which highlighting is applied. It is also possible to move the pointer toward an operation image i0 to which highlighting is applied and confirm its selection.

When highlighting is applied, the controller 1 may make the display panel 6 keep the highlighting until the first output value V1 becomes equal to the third reference value R3. When, after highlighting is started, the first output value V1 becomes equal to the first reference value R1, the controller 1 may make the display panel 6 end the highlighting.

6, Modified Examples: Next, a modified example of the operation input device 100 according to the embodiment will be described. The description thus far has dealt with an example where a warning is indicated if the operation image i0 pointed at the first distance L1 and the operation image i0 pointed at the second distance L2 differ. That is, in this example, a pointed operation image i0 is checked twice before it is selected. Instead, a pointed operation image i0 may be checked three or more times between the first distance L1 to the third distance L3. If not all of the pointed operation images i0 agree, the controller 1 may indicate a warning about the pointed operation images i0.

As described above, an operation input device 100 according to the embodiment or the modified example of it accepts non-contact operation on an operation image i0 with a pointer. The operation input device 100 includes a display panel 6 and a sensing portion 7. The display panel 6 displays an operation screen 62 including the operation image i0 on a display surface 61. The display sensing portion 7 outputs a first output value V1 and a second output value V2. The display sensing portion 7 outputs as the first output value V1 a value corresponding to the distance of the pointer from the display surface 61 in the direction perpendicular to the display surface 61. The display sensing portion 7 outputs as the second output value V2 a value corresponding to the position of the pointer on a plane parallel to the display surface 61. If a first operation image i1, which is the operation image i0 corresponding to the second output value V2 observed when the first output value V1 is equal to a first reference value R1, and a second operation image i2, which is the operation image i0 corresponding to the second output value V2 observed when the first output value V1 is equal to a second reference value R2 different from the first reference value R1, differ, the display panel 6 displays the first and second operation image i1 and i2 with highlighting.

If operation images i0 pointed before confirmation of selection of an operation image i0 differ, the pointer (finger) may have swayed, or the pointer, while being moved closer to the display surface 61, has been moved slantly to a plane parallel to it. A non-contact operation may be being performed so as not to select the operation image i0 that the user wants to select. That is, the gesture being performed may lead to a wrong input. When, as in such a case, a wrong input is likely, it is possible to distinctly show the operation image i0 being pointed at different distances (different values of the first output value V1). In other words, when the pointer has been moved over a plurality of operation images i0 in the course of a non-contact operation for selecting an operation image i0, it is possible to distinctly show the plurality of operation images i0 over which the pointer has been moved. It is thus possible to warn the user, with highlighting, of a possibility of a wrong input; it is possible to warn the user of a possibility of a problem with the gesture for selecting the operation image i0.

The operation input device 100 includes a controller 1. The controller 1 is fed with the output of the display sensing portion 7. The controller 1 may recognize the position of the pointer on the plane parallel to the display surface 61 based on the second output value V2. The controller 1 may take the operation image i0 corresponding to the second output value V2 observed when the first output value V1 is equal to the first reference value R1 as the first operation image i1. The controller 1 may take the operation image i0 corresponding to the second output value V2 observed when the first output value V1 is equal to the second reference value R2 as the second operation image 12. It is possible to determine, based on the second output value V2, the operation image i0 over which the pointer is located. It is thus possible to determine the first and second operation images i1 and i2.

The display panel 6 may newly display an operation screen 62 corresponding to a third operation image i3. The third operation image i3 is an operation image i0 that is determined to have been selected and that corresponds to the second output value V2 observed when the first output value V1 becomes equal to a third reference value R3. The third reference value R3 is a value observed when the distance is shorter than the first and second reference value R1 and R2s. When the first output value V1 is equal to or greater than the first reference value R1 but smaller than the second reference value R2, the display panel 6 may perform pointed position display to indicate the operation image i0 being pointed with the pointer. The third distance L3 is closer to the display surface 61 than the first and second distances L1 and L2. Highlighting is applied before the pointer comes close to the display surface 61 up to the third distance L3. Highlighting can be applied before the pointer is brought close to the display surface 61 up to the third distance L3 and the selected operation image i0 is confirmed. After being notified of a possibility of a wrong input with highlighting, the user can select an operation image i0. After highlighting is applied, the user can continue operation. In other words, the user can determine an operation image i0 to be selected for highlighting. Thus highlighting does not interfere with operation. It is also possible to distinctly show the operation image i0 that is pointed with the pointer before its selection is confirmed.

The controller 1 is fed with the output of the display sensing portion 7. The controller 1 recognizes the position of the pointer on the plane parallel to the display surface 61 based on the second output value V2. The pointer may take the operation image i0 corresponding to the second output value V2 observed when the first output value V1 is equal to the first reference value R1 as the first operation image if. The controller 1 may take the operation image i0 corresponding to the second output value V2 observed when the first output value V1 is equal to the second reference value R2 as the second operation image i2. The controller 1 may take the operation image i0 corresponding to the second output value V2 observed when the first output value V1 is equal to the third reference value R3 as the third operation image i3. The controller 1 may determine the third operation image i3 as the selected operation image i0. When the first output value V1 is equal to or greater than the first reference value R1 but smaller than the third reference value R3, the controller 1 may make the display panel 6 perform pointed position display for the operation image i0 corresponding to the second output value V2. The third distance L3 is closer to the display surface 61 than the first and second distances L1 and L2. Highlighting is applied before the pointer comes close to the display surface 61 up to the third distance L3. Thus, after highlighting is applied, by bringing the pointer close to the operation image i0 that the user wants to select, the user can select the desired operation image i0. That is, with highlighting, the user can first check for a possibility of a wrong input and then select the desired operation image i0. Even after highlighting is applied, the user can continue operation. Highlighting does not interfere with operation. It is also possible to distinctly show the operation image i0 that is pointed with the pointer before its selection is confirmed.

When displaying the first operation image i1 with highlighting, the display panel 6 may display the first operation image i1 in a predefined first highlight color. The first operation image i1 can be highlighted with a particular color. It is possible to distinctly show the user the operation image i0 that is determined to have been selected at the first distance L1.

When displaying the second operation image i2 with highlighting, the display panel 6 may display the second operation image i2 in a predefined second highlight color. The second operation image i2 can be highlighted with a particular color. It is possible to distinctly show the user the operation image i0 that is determined to have been selected at the second distance L2. Different highlighting colors may be used to distinctly show the first and second operation images i1 and i2.

The operation screen 62 may be divided beforehand into a plurality of division regions F1. The division regions F1 may each be a region that includes one operation image i0 and that is larger than the operation image i0 included in it. The display panel 6 may display with highlighting the division region F1 that includes the operation image i0 displayed with highlighting. It is possible to highlight a region larger than an operation image i0. It is possible to enlarge the area that is highlighted. This makes it easy to see which operation image i0 is highlighted.

The display panel 6 may display the boundary of the division region F1. The boundary can then be visually recognized. When displaying the first and second operation image i1 and i2 with highlighting, the display panel 6 may display a message M1 indicating the intention of the highlighting. Even a first-time operator can see what the highlighting is for, that is, the purpose (intension) of the highlighting.

An image forming apparatus (multifunction peripheral 200) according to the embodiment includes the operation input device 100 described above and a printing portion 5 that performs printing. It is possible to show an operation image i0 selected when the distance of the pointer from the display surface 61 equals the first distance L1 and an operation image i0 selected when the distance equals the second distance L2. With highlighting, the user can be notified of a possibility of a problem with a gesture for selecting an operation image i0. The user can be warned of a possibility of a wrong input. It is possible to provide an image forming apparatus that is less prone to wrong inputs despite being provided with a non-contact operation input device 100.

According to the present disclosure, it is possible, when accepting non-contact inputs, to apply highlighting as a pointer is moved over a plurality of operation images before confirmation of selection of an operation image. With highlighting, it is possible to warn the user to prevent wrong inputs.

The embodiment specifically described above is in no way meant to limit the scope of the present disclosure, which can thus be implemented with various modifications made without departure from the spirit of the present disclosure.

The present disclosure find applications in operation input devices and image forming apparatuses that accept non-contact operation.

What is claimed is:

1. An operation input device that accepts non-contact operation on an operation image with a pointer, the operation input device comprising:
   a display panel that displays an operation screen including the operation image on a display surface; and
   a sensing portion that outputs a first output value and a second output value,
   wherein
   the sensing portion
   outputs as the first output value a value corresponding to a distance of the pointer from the display surface in a direction perpendicular to the display surface and
   outputs as the second output value a value corresponding to a position of the pointer on a plane parallel to the display surface,
   if a first operation image, which is the operation image corresponding to the second output value observed when the first output value is equal to a first reference value, and a second operation image, which is the operation image corresponding to the second output value observed when the first output value is equal to a second reference value different from the first reference value, differ, the display panel displays the first and second operation images with highlighting,
   the display panel newly displays the operation screen corresponding to a third operation image,
   the third operation image is the operation image that is determined to have been selected and that corresponds to the second output value observed when the first output value becomes equal to a third reference value,
   the third reference value is a value observed when the distance is shorter than the first and second reference values, and
   when the first output value is equal to or greater than the first reference value but smaller than the second reference value, the display panel performs pointed position display to indicate the operation image being pointed with the pointer.

2. The operation input device according to claim 1, further comprising a controller,
wherein
the controller is fed with an output of the sensing portion, and
the controller recognizes the position of the pointer on the plane parallel to the display surface based on the second output value and takes
the operation image corresponding to the second output value observed when the output value is equal to the first reference value as the first operation image and
the operation image corresponding to the second output value observed when the first output value is equal to the second reference value as the second operation image.

3. The operation input device according to claim 1, further comprising a controller,
wherein
the controller is fed with an output of the sensing portion, and
the controller recognizes the position of the pointer on the plane parallel to the display surface based on the second output value and takes
the operation image corresponding to the second output value observed when the first output value is equal to the first reference value as the first operation image,
the operation image corresponding to the second output value observed when the first output value is equal to the second reference value as the second operation image, and
the operation image corresponding to the second output value observed when the first output value is equal to the third reference value as the third operation image,
the controller determines the third operation image as the selected operation image, and
when the first output value is equal to or greater than the first reference value but smaller than the third reference value, the controller makes the display panel perform the pointed position display for the operation image corresponding to the second output value.

4. The operation input device according to claim 1, wherein
when displaying the first operation image with highlighting, the display panel displays the first operation image in a predefined first highlight color.

5. The operation input device according to claim 1, wherein
when displaying the second operation image with highlighting, the display panel displays the second operation image in a predefined second highlight color.

6. The operation input device according to claim 1, wherein
the operation screen is divided beforehand into a plurality of division regions, and
if the first and second operation images differ, the display panel displays with highlighting the division region that includes the first operation image and the division region that includes the second operation image.

7. The operation input device according to claim 6, wherein
the display panel displays a boundary of the division region.

8. The operation input device according to claim 1, wherein
when displaying the first and second operation images with highlighting, the display panel displays a message indicating an intention of the highlighting.

9. An image forming apparatus comprising:
the operation input device according to claim 1; and
a printing portion that performs printing.

* * * * *